United States Patent Office 3,085,943
Patented Apr. 16, 1963

3,085,943
ANTIMONY PREPARATIONS
Frank Fowler and Leon Golberg, Wilmslow, England, assignors to Benger Laboratories Limited, Cheshire, England
No Drawing. Filed July 29, 1960, Ser. No. 46,075
Claims priority, application Great Britain Aug. 5, 1959
14 Claims. (Cl. 167—68)

This invention relates to improved preparations of antimony for use in the treatment of certain tropical diseases.

It is well known that some compounds of antimony can be used with great benefit in the treatment of certain tropical diseases, such as leischmaniasis and schistosomiasis. Although the means by which these compounds of antimony produce an improvement of the condition is little understood, it is reasonable to suppose that the antimony is the curative agent and must reach the diseased part of the body in order to produce its action. The efficacy of the treatment seems to be dependent upon the nature of the compound or form in which the antimony is used. Measurements of the antimony concentration present in various organs of the body some time after the administration of a dose shows that not only is there a fairly rapid excretion of the antimony from the body in the case of many existing compounds, but there is only a very low concentration of antimony in certain body tissues. A further drawback to the use of some existing compounds is due to their toxic nature, which may be sufficient to cause the death of the patient in some cases.

Among the antimony compounds already proposed are those in which the antimony is combined with a hydroxy carboxylic acid such as gluconic, tartaric or mucic acid and capable of forming neutral stable aqueous solutions. A compound or complex between antimony and cellulose has also been described, but this is unstable in the presence of water, being decomposed into antimony oxides and cellulose. Various antimonial compounds, for example, stibophen, are also known in which the antimony is bound to carbon. The chemical name of stibophen is pentasodium antimony biscatechol-3,5 disulphonate heptahydrate and is the subject of a monograph in U.S.P. XVI.

A principal object of the invention is to provide a new antimony compound with significantly different chemical and physico-chemical properties from existing antimony compounds and in which the antimony is in such a form that it is rapidly absorbed from the site of injection into a muscle, is transported to the various other tissues of the body and is retained for a sufficient time to be therapeutically effective. Further objects of the invention are that the preparation shall have a low rate of excretion from the body and shall have a low toxicity.

With these objects in mind, there has been prepared a therapeutically effective colloidal antimony compound in which the antimony exists in an un-ionised form, and which has been chosen to combine the antimony with a polymer of glucose, in order that the complex, when formed, shall have a suitable molecular weight and stability to ensure the colloidal and other properties desired according to our theory. The polymer of glucose, namely dextran, ($\alpha$ 1:6 polyglucose) was used in a partially depolymerised form, and is preferably of a lower molecular weight than that of dextran employed as a blood volume expander or plasma substitute.

The antimony partially depolymerised dextran complex which we have succeeded in making appears very largely to satisfy the aforesaid objects of our invention and, although we do not yet fully understand the mechanism by which the antimony is transported after absorption into the body, we have found that certain glands, for example, the lymphatic glands which are so often the site of infection, contain many times the quantity of antimony which is obtainable by means of existing compounds. The percentage of antimony excreted from the body in the first 48 hours after injecting our complex is very low. For example, in the rabbit less than 10% of the antimony injected is excreted within the first 48 hours after administering a dose of 20 mgm. of antimony per kgm. body weight. This compares with 80% excreted in 48 hours when using sodium stibogluconate—a frequently used preparation at the present time. It is a standard B.P.C. preparation and is described as a quinquevalent antimony derivative of indefinite composition containing 30 to 34% antimony. It has been represented by the formula $C_6H_9O_9SbNa_2$, but usually there are less than two atoms of sodium for each atom of antimony.

It would also appear that the antimony complex has a low toxicity. Although the material is intended for administration by intramuscular injection, we have found it to be necessary to measure the toxicity by the intravenous route in mice, as the toxicity by the intramuscular route is so low. The $LD_{50}$ toxicity figure obtained varies with the rate of injection of the complex, but when a rate of injection comparable on a body weight basis with that which would be employed intravenously in man is used the toxicity expresesd as $LD_{50}$ I.V. mgm. Sb/kgm. body weight is more than 500, and indicates that our preparation has a toxicity at least as low as that of the best existing preparation. Moreover, when our complex is administered by intramuscular injection, it is rapidly and completely absorbed from the site of injection into the body. The outstanding difference of our complex from other known compounds is that in animals the antimony is preferentially transported to and stored in various glands and tissues of the body, such as the liver and spleen, but of greatest interest mostly into the lymphatic glands, where intimate contact with infective organisms such as micro-filariae, might be expected to occur. Preliminary clinical trials have already shown our material to be at least as effective as the best previously known substances in the treatment of one or two tropical diseases. One of the main advantages of this complex is likely to be the finding that it completely eradicates the disease causing organisms and so prevents a recurrence of the trouble months or years later.

A process has already been described for the complexing of ferric hydroxide with low molecular weight dextran in order to form a therapeutic preparation of iron. In this process a solution of a simple ferric salt is reacted with a low molecular weight dextran in aqueous solution in the presence of alkali, with heating if necesary, to yield a ferric hydroxide low molecular weight dextran complex having a pH in aqueous solution between 4 and 11. However, if this process is used in an attempt to produce our antimony-dextran complex starting for example, with a salt of antimony, such as antimony pentachloride, an unsuitable product results, most of the antimony being filtrable from the dextran solution, in the form of oxides or oxychlorides.

It has been found however that under certain conditions a stable non-ionic complex of colloidal hydrated antimonic acid and dextran can be produced by effecting a double decomposition reaction between a pentavalent antimony salt dissolved in excess of a mineral acid and a basic solution in the presence of dextran.

Advisably, an inorganic antimony salt, and inorganic acids and bases are used in the reaction. Alakli metal hydroxides, or suitable alkali metal salts which hydrolyse to yield basic solutions as the base, and mineral acids such as hydrochloric acid and nitric acid, can be used in the process.

A solution of an antimony salt in an excess of a mineral acid which can yield a soluble salt can be reacted, with such heat as may be necessary, with a base or hydroxylating agent, such as sodium hydroxide or sodium acetate in the presence of an aqueous solution of a low molecular weight dextran, in order to yield a final solution which is essentially neutral and from which a very small proportion only, if any, of the antimony as basic oxides or oxychlorides may be separated by filtration before the final purification stages. The essential feature of the reaction appears to be the replacement of the inorganic acid radicals in the anionic moiety of the antimony salt with hydroxyl groups, momentarily to yield a hydrated antimony oxide or antimonic acid which, in the presence of dextran, and with such heat treatment as may be necessary, immediately produces the stable and colloidal antimony-dextran complex provided herewith.

The complex can be produced by dissolving a salt of antimony such as antimony pentachloride in excess hydrochloric acid and adding the resulting solution to a solution of low molecular weight dextran containing an alkali such as sodium hydroxide in an amount equivalent to the chloride content of the anion thus yielding an essentially neutral mixture. The hydrochloric acid is generally used in an amount not less than 1 gram mol. wt. of acid per gram atomic weight of antimony. The dextran solution may, with advantage, be prepared by dissolving dextran powder in a hot solution of sodium hydroxide, the resulting solution being adjusted to contain the required proportion of alkali and dextran for reaction with the antimony solution. The complex can then be purified and partially freed from unwanted electrolytes by the addition of a water miscible solvent such as ethyl alcohol or acetone, the syrup which is precipitated being redissolved in water to give a solution of the purified product or complex (after removal of solvent).

Alternatively, our complex can be prepared by dissolving a salt of antimony such as antimony trichloride in a mixture of hydrochloric and nitric acids, and adding the resulting solution containing a complex ion rapidly to a solution of low molecular weight dextran containing alkali such as sodium hydroxide until the pH has been reduced to about neutral.

The low molecular weight dextran fraction used can be obtained by known methods by the partial depolymerization, such as by acid hydrolysis, of high molecular weight dextran produced by fermentation of certain strains of *Leuconostoc mesenteroides*. The depolymerized dextran is then purified and rendered less poly-disperse by fractionation from aqueous solutions of ethyl alcohol or acetone.

It has been found that fractions of dextran which have been fractionated so as to contain relatively closer ranges of molecular size polymer and having average intrinsic viscosities at 25° C. between 0.025 and 0.25 (corresponding to molecular weights of approximately 1,000–100,000) can be used for the present purpose. The preferred range of average intrinsic viscosity in order to yield a final product satisfactory also from other points of view, such as viscosity of the injection solution and antimony content, is between approximately 0.03 and 0.15.

Although the molecular structure of the product is not yet known with certainty and it can therefore, be defined only in empirical terms, the parenteral antimony preparation can possibly consist of an aqueous solution of colloidal hydrated antimonic acid complexed with enough of the partially depolymerized dextran to stabilize the solution satisfactorily for the objectives of the treatment to be attained. Solutions are obtained using dextrans having an average intrinsic viscosity of 0.03–0.15 and containing 10% Sb and between 15–30% dextran.

This new complex has a very high degree of stability in aqueous solution especially at room temperature, as can be shown by determining the time which elapses before decomposition occurs at various temperatures and then extrapolating the results graphically. The results indicate that the preparation will be stable for at least five years at ordinary temperatures and before any sign of decomposition occurs.

The following are examples of the methods by which our new and novel antimony preparations can be made:

Example 1

To 30 gms. of antimony pentachloride are added 32 ml. of concentrated hydrochloric acid. The resulting solution is diluted with 107 ml. with distilled water and added with stirring to a solution containing 122 gms. of a low molecular weight dextran fraction (intrinsic viscosity of 0.05) and 35 gms. of sodium hydroxide in a volume of about 610 ml. The final mix, the pH of which is about 5, is heated to boiling to complete the reaction, filtered to remove any insoluble antimony oxides and is purified and freed from electrolyte by repeated precipitation with 2 volumes of ethyl alcohol (85% by weight). The syrupy precipitate obtained is dissolved in water and the alcohol removed by evaporation. The resulting aqueous solution is then adjusted to contain a specified amount of antimony such as 2% w./v. and after filtration is filled into suitable containers such as ampoules and sterilized by heating at 115–116° C. for not less than 30 minutes.

Example 2

15.4 gms. of antimony trioxide are dissolved in 100 ml. of concentrated hydrochloric acid and 50 ml. of concentrated nitric acid. This solution is then added with stirring to a solution containing 180 gms. of a low molecular weight dextran fraction having an intrinsic viscosity of 0.05 and 72 gms. of sodium hydroxide in a total volume of about 1 litre of distilled water. The final mixture has a pH of approximately 7. The solution of the antimony dextran complex thus obtained is then purified by dialysis when the sodium nitrate and sodium chloride pass through the membrane and are discarded. When the concentration of inorganic salts has reached a suitably low level, the contents of the dialysis chamber are filtered to remove any undissolved antimony compounds or other material and evaporated so that the solution contains a suitable concentration of antimony, such as 2% w./v., and after a further filtration is filled into suitable containers and sterilized by heating at 115–116° C. for not less than 30 minutes.

Example 3

To 51.6 gms. of antimony pentachloride are added 30.2 mls. of concentrated hydrochloric acid. The resulting solution is diluted to 100 mls. with distilled water and added with stirring to a solution containing 126 gms. of a low molecular weight dextran fraction (intrinsic viscosity of 0.05) and 156 gms. of sodium acetate trihydrate in a volume of about 575 mls. The final mix, the pH of which is about 4.0, is preferably heated to boiling to complete the reaction, filtered to remove any insoluble antimony oxides, and is purified by precipitation with 3 volumes of ethyl alcohol (85% by weight), and the syrupy precipitate obtained dissolved in water and the alcohol removed by evaporation. The resulting aqueous solution is then adjusted to contain a suitable amount of antimony such as 5% w./v., and after filtration is filled into suitable containers such as ampoules and sterilized by heating at 115–116° C. for not less than 30 minutes.

Example 4

To 51.6 gms. of antimony pentachloride are added 30.2 mls. of concentrated hydrochloric acid. The resulting solution is diluted to 100 mls. with distilled water and added with stirring to 450 mls. of a dextran solution containing 84 gms. of low molecular weight dextran (average intrinsic viscosity 0.06), 47 gms. of sodium hydroxide and 100 gms. of sodium chloride. The final mix, the pH of which is about 4.0, is preferably heated to boiling to complete the reaction, filtered if necessary to remove any insoluble antimony oxides and is purified by precipitation with 3 volumes of ethyl alcohol (85% by weight), and the syrupy precipitate obtained dissolved in water and the alcohol removed by evaporation. The resulting aqueous solution is then adjusted to contain a suitable amount of antimony such as 5% w./v., and after filtration is filled into suitable containers such as ampoules and sterilized by heating at 115–116° C. for not less than 30 minutes.

*Example 5*

To 30 gms. of antimony pentachloride are added 32 ml. of concentrated hydrochloric acid. The resulting solution is diluted to 107 ml. with distilled water and added simultaneously with a solution of 35 gms. sodium hydroxide in 100 ml. water to a stirred solution containing 122 gms. of a low molecular weight dextran fraction (intrinsic viscosity of 0.05) in 500 ml. water, the pH being maintained between 3–7 during the addition. The final mix, the pH of which is about 5, is heated to boiling to complete the reaction, filtered to remove any insoluble antimony oxides and is purified and freed from electrolyte by repeated precipitation with 2 volumes of ethyl alcohol (85% by weight). The syrupy precipitate obtained is dissolved in water and the alcohol removed by evaporation. The resulting aqueous solution is then adjusted to contain a specified amount of antimony such as 2% w./v. and after filtration is filled into suitable containers such as ampoules and sterilized by heating at 115–116° C. for not less than 30 minutes.

*Example 6*

30.6 lbs. antimony pentachloride are added to 1.8 gallons of concentrated hydrochloric acid and the resulting solution diluted to 6 gallons with distilled water. This solution is added with stirring to 36 gallons of a dextran solution made by dissolving 100 lbs. of powdered low molecular weight dextran (average instrinsic viscosity 0.05) in 25 gallons of a boiling solution of approximately 2 N sodium hydroxide, diluting the cooled solution to 36 gallons and at the same time adjusting the strength of solution to 2 N with respect to sodium hydroxide.

The final mix, the pH of which is about 5, is heated to boiling to complete the reaction, filtered to remove any insoluble antimony oxides and is purified and freed from electrolyte by repeated precipitation with 2 volumes of ethyl alcohol (85% by weight). The syrupy precipitate obtained is dissolved in water and the alcohol removed by evaporation. The resulting aqueous solution is then adjusted to contain a specified amount of antimony such as 2% w./v. and after filtration is filled into suitable containers such as ampoules and sterilized by heating at 115–116° C. for not less than 30 minutes.

Various changes and modifications of the invention can be made and, to the extent that such variations incorporate the spirit of this invention, they are intended to be included within the scope of the appended claims.

What is claimed is:

1. A composition comprising a substantially nonionic complex of colloidal hydrated antimonic acid with dextran having an average intrinsic viscosity at 25° C. of about 0.025 to about 0.25, said complex being stable in contact with water.

2. A therapeutic composition comprising a stable aqueous solution of a substantially non-ionic complex of colloidal hydrated antimonic acid with a dextran having an average intrinsic viscosity at 25° C. of about 0.025 to about 0.25.

3. A composition according to claim 2 having at least 2% antimony by weight.

4. A composition comprising a substantially non-ionic complex of colloidal hydrated antimonic acid with a dextran having an average intrinsic viscosity at 25° C. of about 0.03 to 0.15, said complex being stable in contact with water.

5. The process which comprises parenterally administering to an animal a therapeutic amount of a substantially non-ionic complex of colloidal hydrated antimonic acid with a dextran having an average intrinsic viscosity at 25° C. of about 0.025 to about 0.25.

6. The process of producing a substantially non-ionic complex of colloidal hydrated antimonic acid with dextran which comprises combining an acidic solution of a pentavalent antimony salt with an equivalent amount of a basic solution in the presence of a dextran having an intrinsic viscosity at 25° C. of 0.025 to 0.25 so as to provide an approximately neutral mixture containing the said complex.

7. The process of producing a substantially non-ionic complex of colloidal hydrated antimonic acid with dextran which comprises combining an acidic solution of a pentavalent antimony salt with an equivalent amount of a basic solution in the presence of a dextran having an intrinsic viscosity at 25° C. of 0.025 to 0.25 so as to provide an approximately neutral mixture containing the said complex and heating the mixture to an elevated temperature up to the boiling point.

8. The process of claim 7 in which the dextran has a viscosity at 25° C. of 0.03 to 0.15.

9. The process according to claim 7 in which electrolytes are removed from the solution of the complex.

10. The process according to claim 7 in which electrolytes are removed by adding a water miscible organic solvent to the solution to precipitate the complex, the precipitated complex is separated therefrom and redissolved in water.

11. The process according to claim 7 in which the antimony salt is antimony pentachloride and the antimony salt solution is acidified with hydrochloric acid in an amount not less than 1 gram mol. wt. of acid per gram atomic weight of antimony.

12. The process of claim 7 in which the dextran solution is made basic with an alkali metal hydroxide.

13. The process of producing a substantially non-ionic complex of colloidal hydrated antimonic acid with dextran which comprises combining an acidic solution of a pentavalent inorganic antimony salt with an equivalent amount of a basic solution in the presence of a dextran having an intrinsic viscosity at 25° C. of 0.03 to 0.15 so as to provide an approximately neutral mixture containing the said complex, heating the mixture to an elevated temperature up to the boiling point, and removing electrolytes therefrom.

14. The process which comprises forming colloidal hydrated antimonic acid in complex with dextran at an essentially neutral to acidic pH by a double decomposition reaction between a pentavalent antimony salt and a base in the presence of an aqueous solution of a dextran having an intrinsic viscosity at 25° C. of 0.025 to 0.25.

References Cited in the file of this patent

UNITED STATES PATENTS 2,820,740    London et al. _____ Jan. 21, 1958

OTHER REFERENCES

"Imferon," 7 pp. brochure by Lakeside Labs., Inc., 1955.